US012800336B2

(12) United States Patent
Jeihani et al.

(10) Patent No.: US 12,800,336 B2
(45) Date of Patent: Nov. 17, 2026

(54) ROAD WORK ZONE NAVIGATION AND SAFETY ALERT APP

(71) Applicant: Morgan State University, Baltimore, MD (US)

(72) Inventors: Mansoureh Jeihani, Timonium, MD (US); Nashid K Khadem, Baltimore, MD (US); Md Muhib Kabir, Cockeysville, MD (US)

(73) Assignee: MORGAN STATE UNIVERSITY, Baltimore, MD (US)

( * ) Notice: Subject to any disclaimer, the term of this patent is extended or adjusted under 35 U.S.C. 154(b) by 0 days.

(21) Appl. No.: 18/649,181

(22) Filed: Apr. 29, 2024

(65) Prior Publication Data

US 2024/0361145 A1 Oct. 31, 2024

Related U.S. Application Data

(60) Provisional application No. 63/462,484, filed on Apr. 27, 2023.

(51) Int. Cl.

| | |
|---|---|
| ***G01C 21/36*** | (2006.01) |
| *G01C 21/34* | (2006.01) |
| *G08G 1/0967* | (2006.01) |

(52) U.S. Cl.

CPC ......... *G01C 21/3691* (2013.01); *G01C 21/34* (2013.01); *G08G 1/0967* (2013.01)

(58) Field of Classification Search

CPC ... G01C 21/34; G01C 21/3691; G08G 1/0967

See application file for complete search history.

(56) References Cited

U.S. PATENT DOCUMENTS

| | | | | |
|---|---|---|---|---|
| 11,847,912 | B1 * | 12/2023 | Clark | G08G 1/0967 |
| 2011/0181443 | A1 * | 7/2011 | Gutierrez | G01C 21/3697 340/990 |
| 2013/0321456 | A1 * | 12/2013 | Hultquist | G01C 21/3667 345/173 |
| 2020/0192386 | A1 * | 6/2020 | Stenneth | G01C 21/3602 |
| 2022/0180455 | A1 * | 6/2022 | Hourdos | G06Q 50/08 |

OTHER PUBLICATIONS

Google Support, "Plan road closures with the Closure Tool," published at https://support .google.com/waze/partners, retrieved by the Wayback Machine on or before Oct. 6, 2022 (pp. 1-4). (Year: 2022).*

Waze, "Get to Know Waze," published on YouTube (https://www.youtube.com/watch?v=YNjFngFhts8) on Jun. 14, 2018 (duration 7 minutes and 5 seconds). (Year: 2018).*

* cited by examiner

*Primary Examiner* — Dino Kujundzic

(74) *Attorney, Agent, or Firm* — Whiteford, Taylor & Preston LLP; Peter J. Davis

(57) ABSTRACT

A secure and dedicated desktop/mobile navigation application architecture has been developed to help disseminate accurate work zone information from authentic sources for commercial and other motor vehicles for safe and efficient travel routing, including a contractor module for use by the contractor or government agency to enter road work information, a driver module for calculating navigation routes to driver designated destinations taking into account contractor road work information, and a management module for managing communication between the contractor module and the driver module.

11 Claims, 29 Drawing Sheets

FIGURE 3
WZ Contractor
Username
Password
Sign In
Forgot password?
Sign up
Terms & Conditions

FIGURE 4
Sign up
First name
Last name
Organization
Registration no
Organization email
Phone
Username
Password
Confirm Password
Confirm

FIGURE 10
Set new work zone...
Start date & time
ENTER TIME
7
15
AM
PM
Hour
Minute
CANCEL
OK

FIGURE 11
Set new work zone...
End date & time
ENTER TIME
7
15
AM
PM
Hour
Minute
CANCEL
OK

FIGURE 17
695 Westbound ....
39.542311, -79.235412
White Marsh Blvd ....
39.542311, -79.235412
Baltimore-Washington Pkwy ....
39.542311, -79.235412
ADD

FIGURE 20
Username
Password
Sign In
Sign up
Terms & Conditions

FIGURE 21
Sign up
First name
Last name
Email
Phone
Username
Password
Confirm Password
Confirm

ROAD WORK ZONE NAVIGATION AND SAFETY ALERT APP

GOVERNMENT RIGHTS

This invention was made with government support under grant number 522956, awarded by the Federal Carrier Safety Administration, and grant number UMEC010 from the Urban Mobility and Equity Center. The government has certain rights in the invention.

FIELD OF THE INVENTION

This invention relates to a system and method for alerting drivers to road work zones and suggesting alternate routes when applicable.

BACKGROUND OF THE INVENTION

U.S. Pat. No. 10,692,365, entitled "Intelligent Road Infrastructure System (IRIS): Systems and Methods," discloses providing vehicles with information that goes beyond work zone activity. U.S. Pat. No. 10,244,564, entitled "Network and Connected Devices for Emergency Response and Roadside Operations," relates to sensors and a network to warn of work zones, among other road hazards. U.S. Pat. No. 9,964,414, entitled "Lane-Level Vehicle Navigation for Vehicle Routing and Traffic Management," discloses work zones as part of their coverage. U.S. Pat. No. 9,202,374, entitled "Event Warning System and Method Thereof," discloses real-time personalized alert warnings via software. U.S. Pat. No. 6,963,278, entitled "Method and Apparatus for Enhancing Safety Within a Work Zone" identifies construction workers onsite. U.S. Patent Application No. 0200305064 entitled "Vehicle-to-Everything (V2X), Vehicle-to-Vehicle (V2V), and Vehicle-to-Infrastructure (V2I) Policy for Managing Distracted Driving" includes a reference to work zones.

SUMMARY OF THE INVENTION

The invention is a Web/server-based application, including applications for desktop and mobile devices, that allows road work contractors to provide precise and reliable information concerning the day, time, location, and duration of road work zones that is integrated into navigation tools that allows drivers to make decisions whether to drive through or around work zones.

The work zone safety application according to the invention will help commercial vehicle operators to navigate their way through or around work zones. According to preferred embodiments of the invention, there will be two different user interfaces: one for the road work contractor/worker, and one for the commercial road users.

According to the invention, road work contractors will upload information about the road work (repair, rebuild, resurface, etc.) on the contractor app/interface/webpage. Road work contractors will have an authorized user credential to ensure the authenticity of the data. The contractor will be prompted to enter into the app information pertinent to the project and its impact on traffic, including duration of the work with time and date, working hours, location of the work zone, length of the work zone, number of lane closures, average speed in the work zone, type of road (local, arterial, highway etc.). If any change occurs in any of the details of the road work, the app will allow and prompt the road work contractor to provide updated information at and/or closer to the beginning and end date of the work.

According to some embodiments of the invention, and depending on State and Federal guidance, there may be some assessment and categorization of the work zone some time before the actual construction takes place.

According to preferred embodiments of the invention, the app will be offered through Apple's AppStore, the Android Play Store and/or from the Federal Motor Carrier Safety Administration or other government organization websites. The road users (commercial drivers) will use the app for route guidance. For route guidance, the app uses the GPS location of the user's mobile device and Google Maps API or similar API as the map layer. The app is linked to a database which stores the information provided by the road work contractor, so that drivers get the most updated and authentic road work zone information both in static format and during dynamic route guidance.

According to preferred embodiments of the invention, road and road work information may be provided to driver users of the app via audio. After the driver passes each work zone, a voice command option may ask the driver if the information provided concerning the road work zone was correct.

According to further embodiments of the invention, the invention may employ connected vehicle function features for commercial vehicles. According to these embodiments, the invention will use connected vehicle technology to communicate through Vehicle to Vehicle (V2V) and Vehicle to Infrastructure (V2I) communication protocols. For example, the V2I communication platform may be used to provide work zone information from the contractor's app to drivers through the traffic management center via Roadside Unit (RSU). Connected vehicles use Dedicated Short-Range Communications (DSRC) to maintain communication with V2I and V2V. Received information will be stored only if it falls within the chosen route. This stored message will be validated with other connected vehicles (CV) and RSUs during the trip to provide the latest information to the user/driver. Drivers will get alerts at least 5 miles before the work zone to take necessary precautions. This will utilize the same in-vehicle GPS and voice command system to avoid distracting the drivers.

BRIEF DESCRIPTION OF DRAWINGS

The foregoing summary, as well as the following detailed description of an exemplary embodiment of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown in the drawings.

DETAILED DESCRIPTION OF THE INVENTION

Both the road work contractor app (mobile and web version) and commercial driver app may be downloaded from any app store and/or from selected government transportation/motor vehicle agency's websites. While the road work contractor app and commercial drive app are described herein as separate mobile applications, they are connected and developed in one main environment for operational efficiency.

The details of the invention will now be explained by way of a walk-through of the invention's use, first by a road work contractor, and then by a commercial driver (truck driver, taxi driver, limo driver, etc.). While the invention is described herein with reference to a commercial driver, the exemplary description herein is not intended to limit application of the invention, as the invention and its use may be used by any kind of driver. Additionally, while the details of the invention are explained herein with reference to mobile apps as being the interface between the invention and the user (particularly a contractor user and a driver user), it is intended that the invention may be implemented for any user using a tablet, a desktop computer, a laptop computer, kiosk or other special purpose computerized device that has access to other elements of the system over a wide area network. In a web-based application, for example, as opposed to a mobile app, the invention may be implemented with different visual presentations/web pages, but the overall operation is the same as explained herein. In particular, to the extent that the government agency feature is implemented, it is somewhat more likely that it will be with a desktop, laptop, kiosk, or special purpose device, although the government agency user may certainly use a mobile app, as well.

Figure 1A:
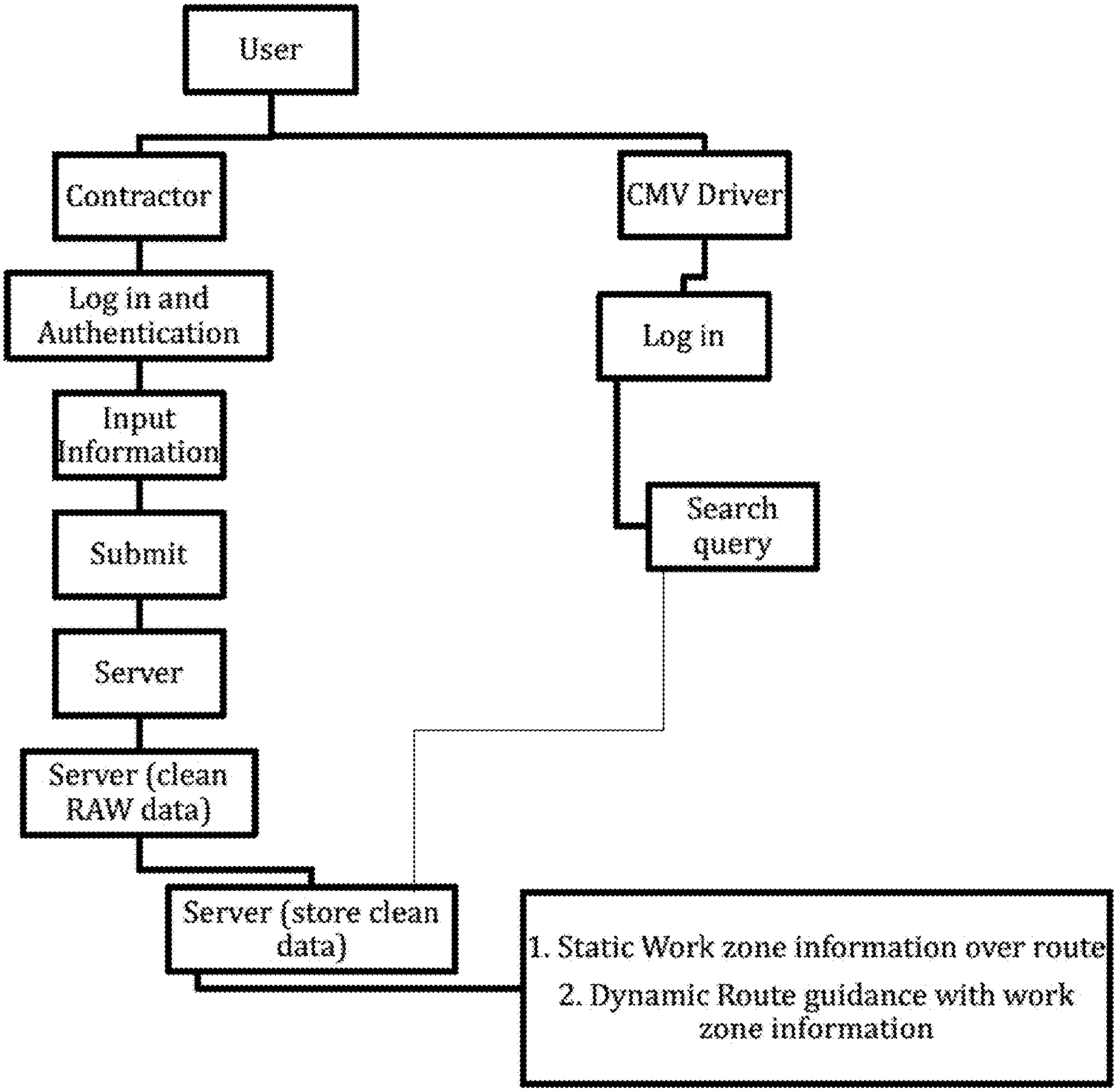
FIG. 1A is a chart showing the steps involved in taking road work information from road work contractors and using it to provide relevant route information to drivers according to an embodiment of the invention.
Figure 1B:
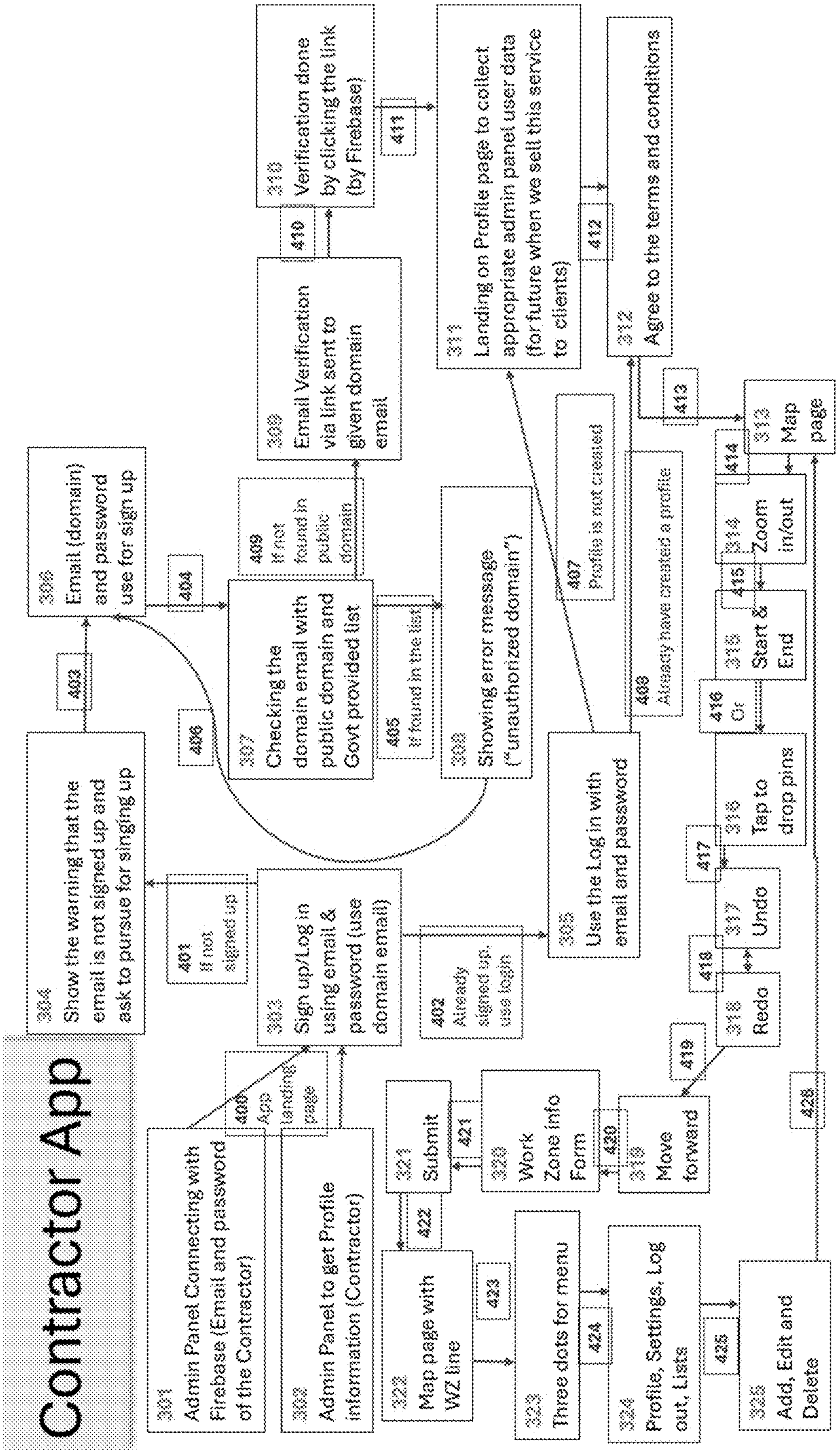
FIG. 1B is a chart showing steps involved in the contractor app according to an embodiment of the invention.
Figure 2:
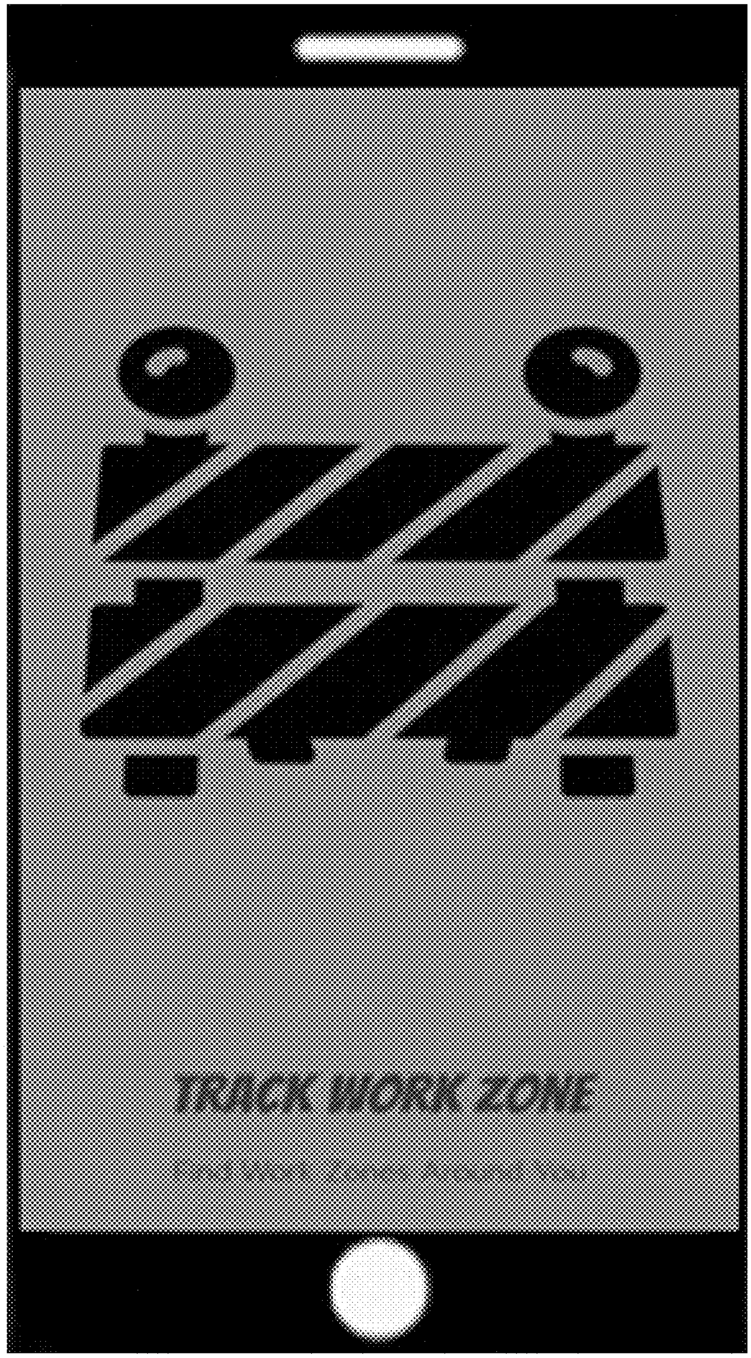
FIG. 2 is an app landing/welcome page for road work contractors according to an embodiment of the invention.
Figure 3:
FIG. 3 is a login/registration page for road work contractors according to an embodiment of the invention.
Figure 4:
FIG. 4 is a registration page for road work contractors according to an embodiment of the invention.

Once the app has been downloaded and installed on the contractor's mobile device, the app icon (e.g., FIG. 2) will appear on the contractor's mobile device. To launch the app, the contractor clicks on the app icon in the standard fashion. This action opens the launch page, FIG. 3. If the contractor has already signed up for the service, then he/she uses authorized credentials to log in. If the contractor is not already an authorized user, he/she will be required to register by clicking on the sign-up button, which will take the user to the registration form, e.g., FIG. 4. The sign-up and log-in method and condition flow charts are mentioned in FIG. 1B, with steps identified in 300 series blocks and conditions shown in 400 series blocks. After launching the contractor app (mobile and/or web) they will be taken to step 303 via process 400. If the contractor is already signed up, they will follow steps 305, 311, and 312 to land on to the Map page (detail description in next paragraph) at 313 via conditions 402, 407, 408, 412, and 413. On the other hand, if the contractor is not signed up, then it will follow steps 304, 306, 307, 309-312 to land on to the Map page (detail description in next paragraph) at 313 via conditions 401, 403, 404, 409-413. There is step 308 kept for verification of the domain the contractor is using to maintain the authenticity of the data. If the domain provided does not pass, it will return to step 306 via 406.

Figure 5:
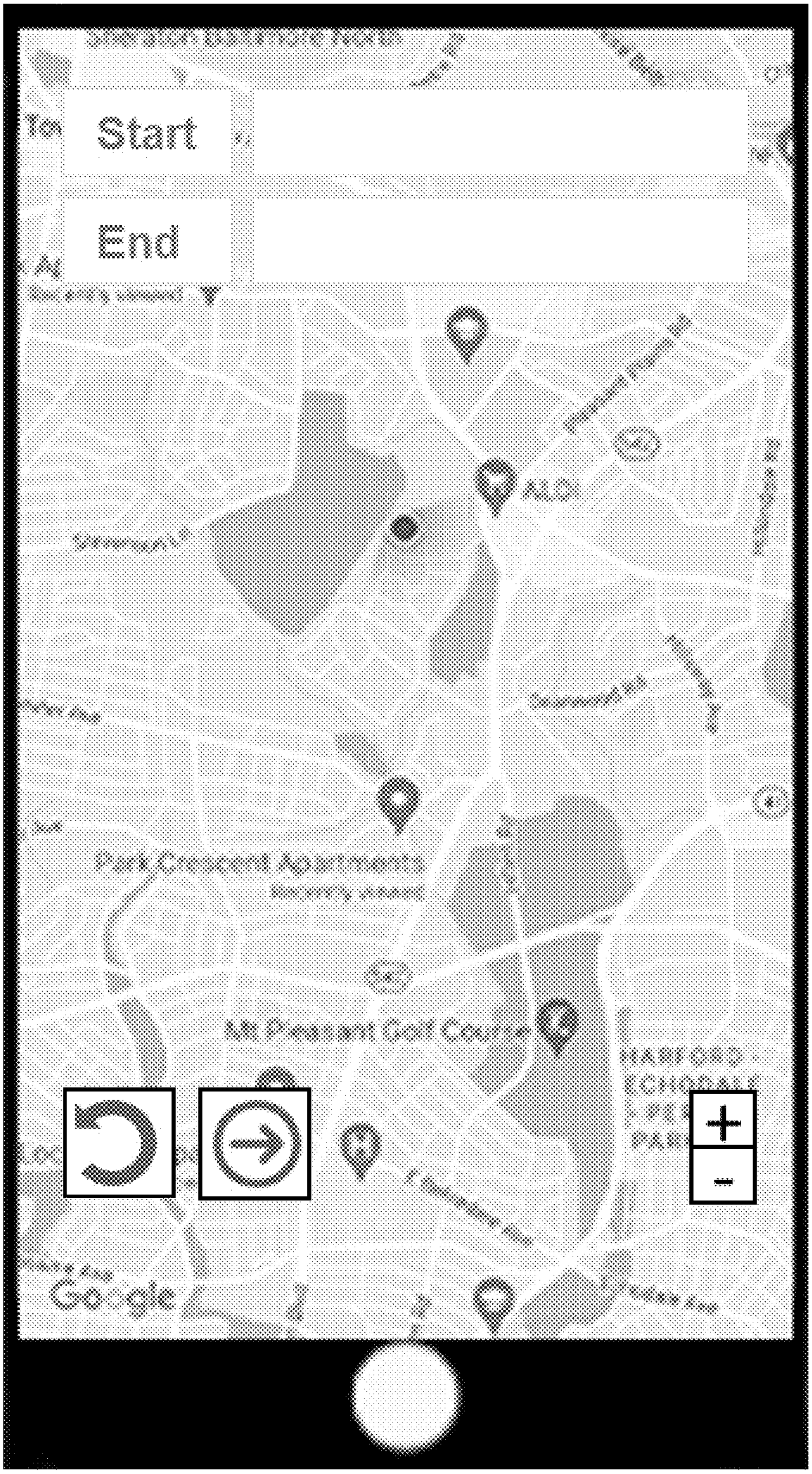
FIG. 5 is a road work location entry page for road work contractors according to an embodiment of the invention.
Figure 6:
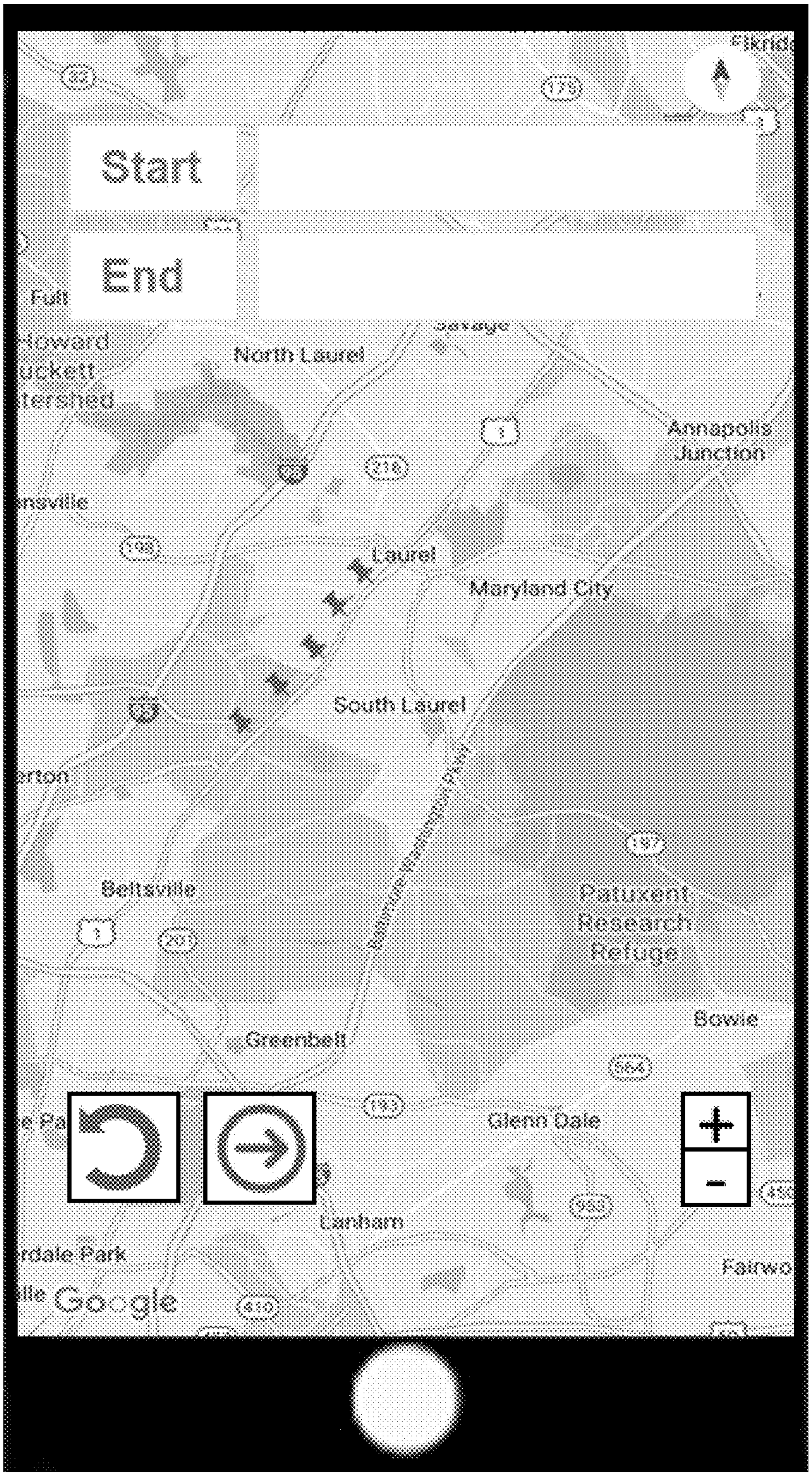
FIG. 6 is a road work location entry page for road work contractors showing work zone location by dropped pins according to an embodiment of the invention.

Following login, the contractor is presented with a map page, e.g., FIG. 5. On the map page, the contractor is prompted to enter road work zone start and end locations using addresses or coordinate values. Alternatively, the contractor can tap the screen to drop pins at the road work location, e.g., FIG. 6. In either event, the user will then click the right arrow to advance to the next page or click the undo/counterclockwise arrow to undo/refresh. From the FIG. 1B, once the contractor is signed up and logged in and landed on the Map page (313), they will follow steps 314-318 to draw the work zone using above-mentioned methods (address, coordinate, and tap) via 414 to 418 flow.

Figure 7:
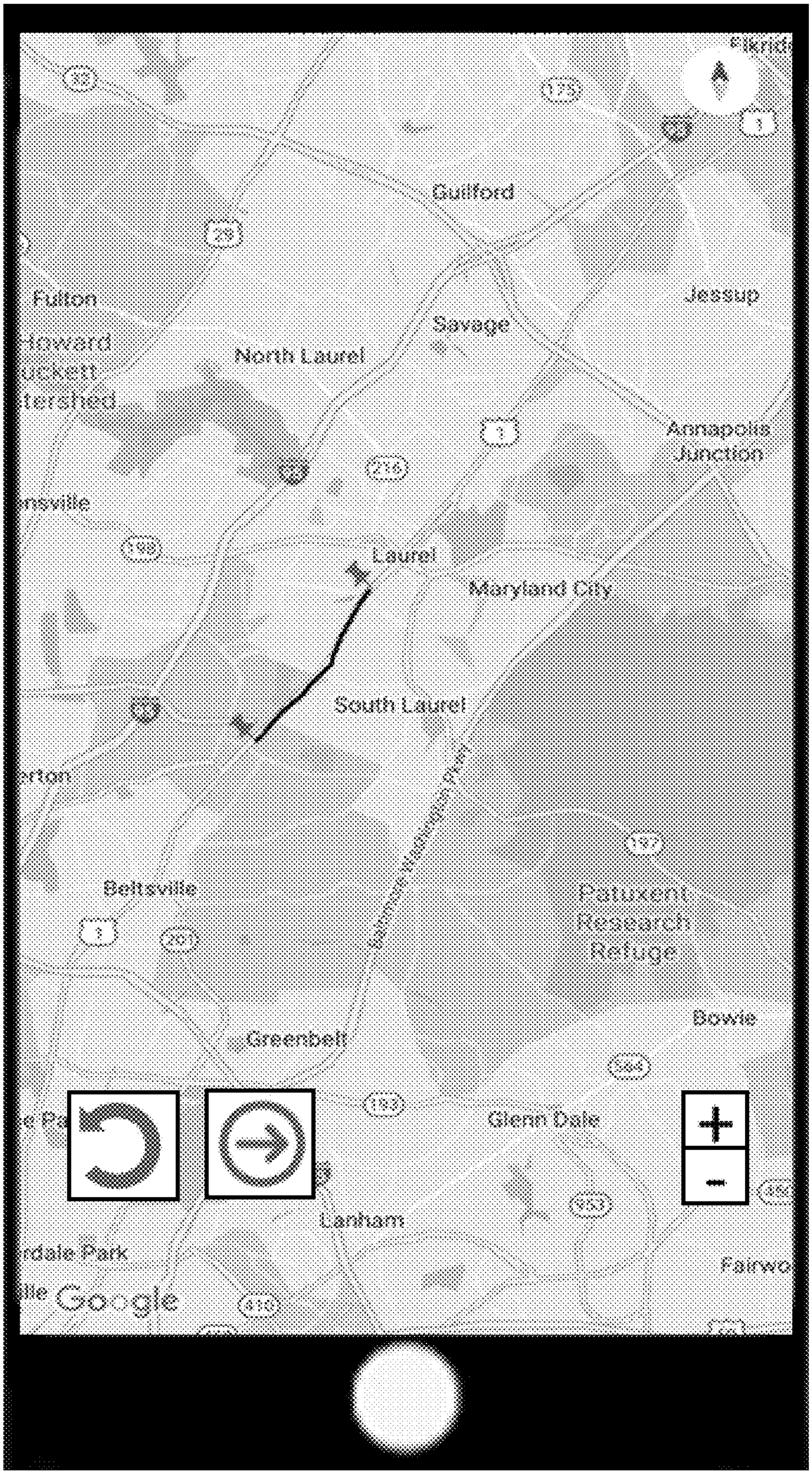
FIG. 7 is a road work location entry page for road work contractors highlighting the road work zone according to an embodiment of the invention.

Once the contractor has identified the roadwork location and advanced to the next page, the next page will show the roadwork zone as a line feature on the top of the road, e.g., FIG. 7. If the road work zone is shown to the satisfaction of the contractor, the contractor may click on the right arrow to advance to the next page to enter the road work zone details. If the work zone is not shown to the satisfaction of the contractor, the contractor may go back to the prior page by clicking the undo/refresh button.

Figure 8:
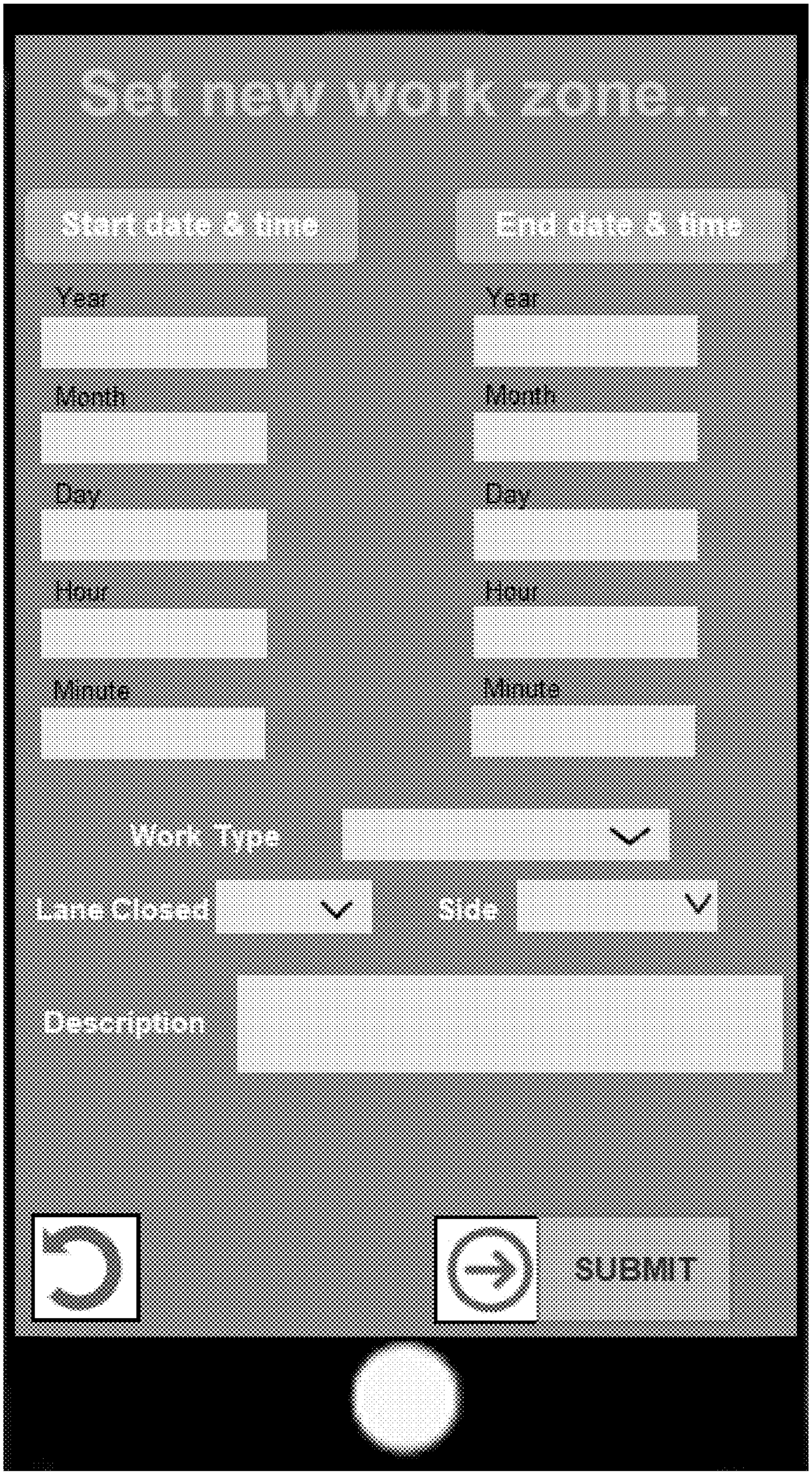
FIG. 8 is a road work information entry page for road work contractors according to an embodiment of the invention.
Figure 9:
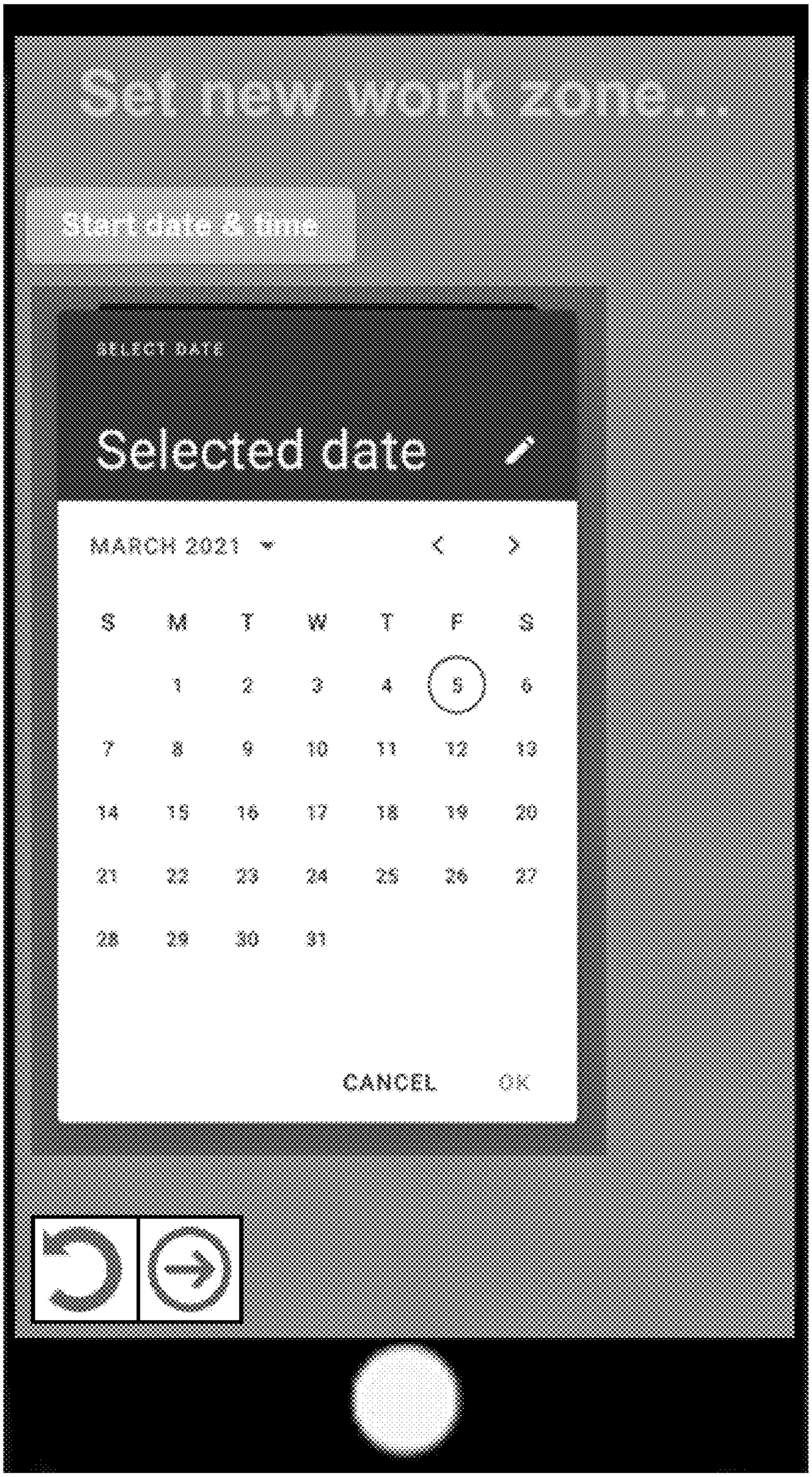
FIG. 9 is a road work start date entry page for road work contractors according to an embodiment of the invention.
Figure 10:
FIG. 10 is a road work start time entry page for road work contractors according to an embodiment of the invention.
Figure 11:
FIG. 11 is a road work end time entry page for road work contractors according to an embodiment of the invention.
Figure 12:
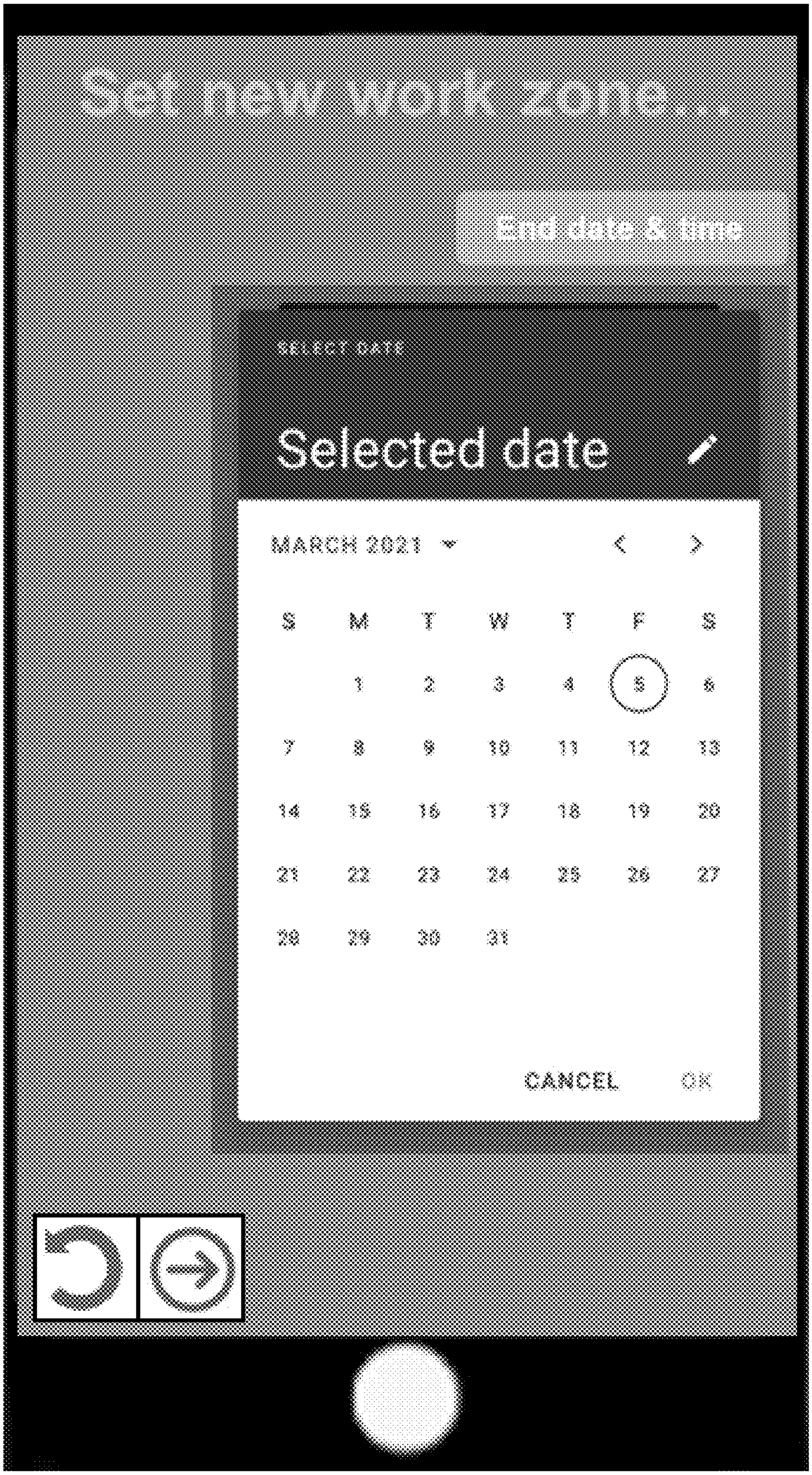
FIG. 12 is a road work end date entry page for road work contractors according to an embodiment of the invention.

On the work zone details page, FIG. 8, the contractor is prompted to enter the start and end dates and times, as well as additional road work zone details. The contractor can enter the year, month, day, hour and minutes for the start and end day(s)/times manually in the fields provided, or the contractor can click in the start date & time/end date & time buttons at the top of the page to pull up calendar entry and time entry pages, e.g., FIGS. 9-12. From the FIG. 1B, the contractor will use step 319 to move forward if the drawing is correct via flow 419 and. Then they will move to step 320 via 420 to plug necessary information to the form mentioned above.

Figure 13:
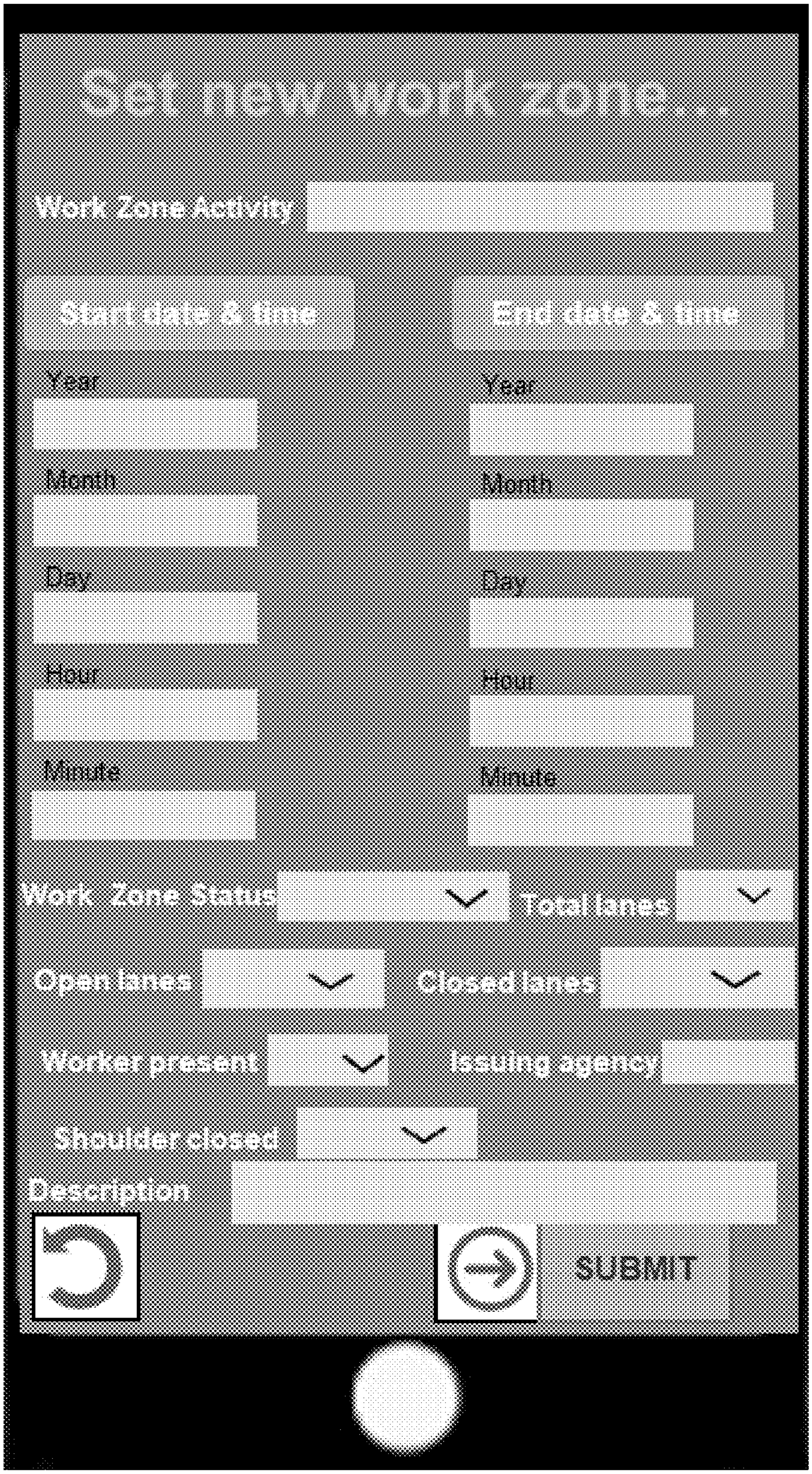
FIG. 13 is a road work information entry page for road work contractors according to an alternative embodiment of the invention.
Figure 14:
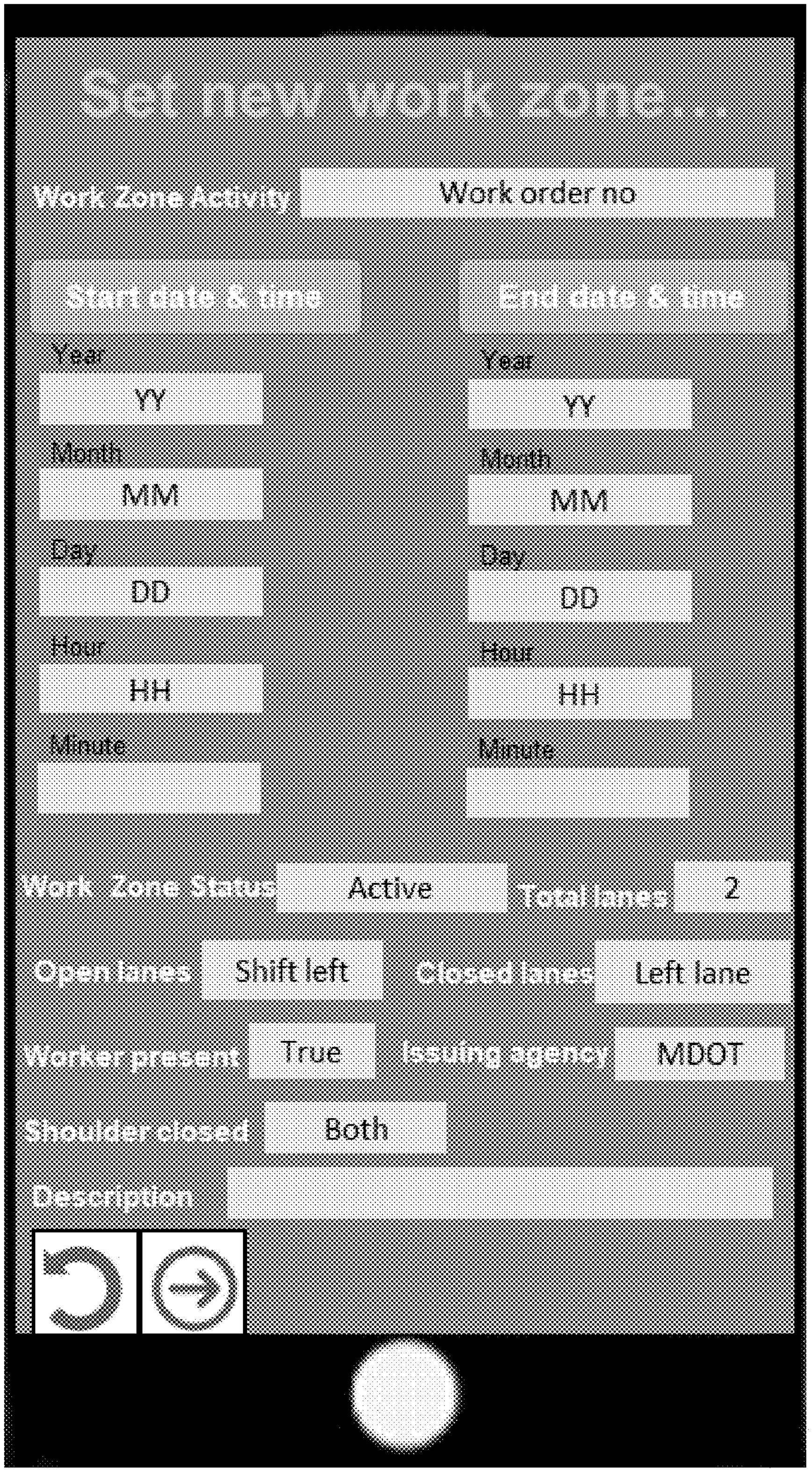
FIG. 14 is an example of a partially completed road work information entry page according to an embodiment of the invention.
Figure 15:
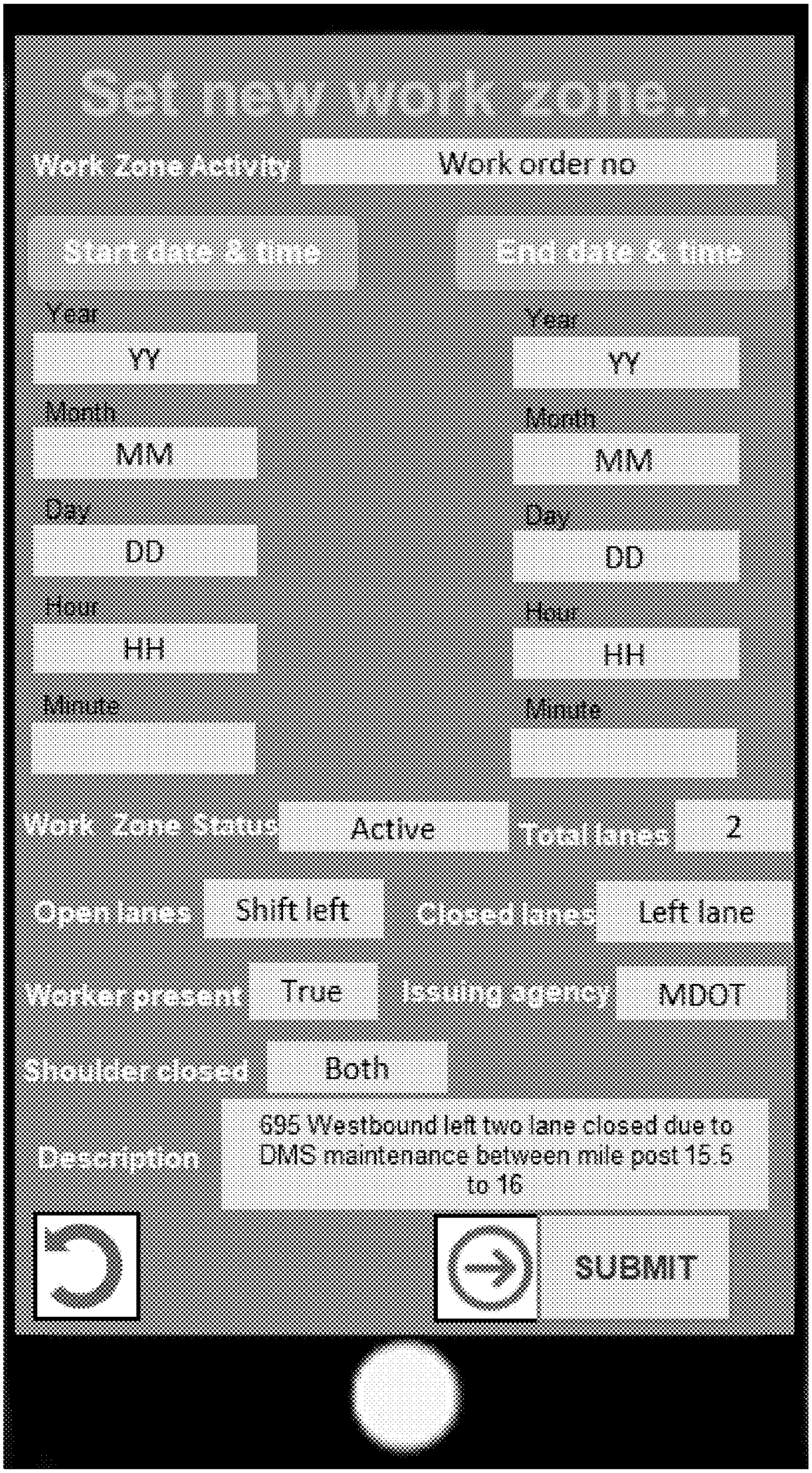
FIG. 15 is an example of the road work information entry page of FIG. 14 containing additional information according to an embodiment of the invention.
Figure 16:
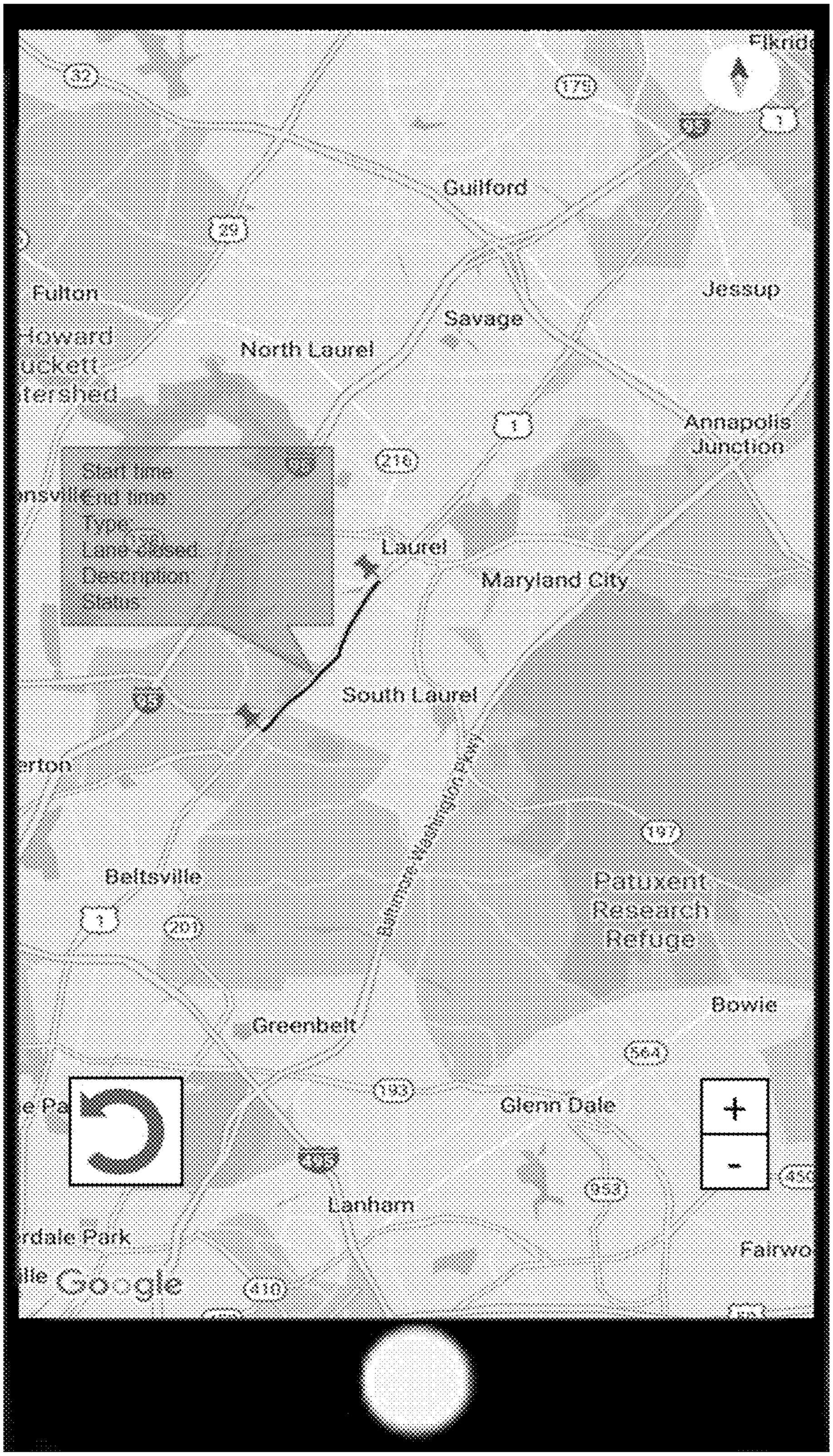
FIG. 16 is a road work information page for road work contractors showing a "details" pop-up according to an embodiment of the invention.
Figure 17:
FIG. 17 is a road work projects list page for road work contractors according to an embodiment of the invention.
Figure 18:
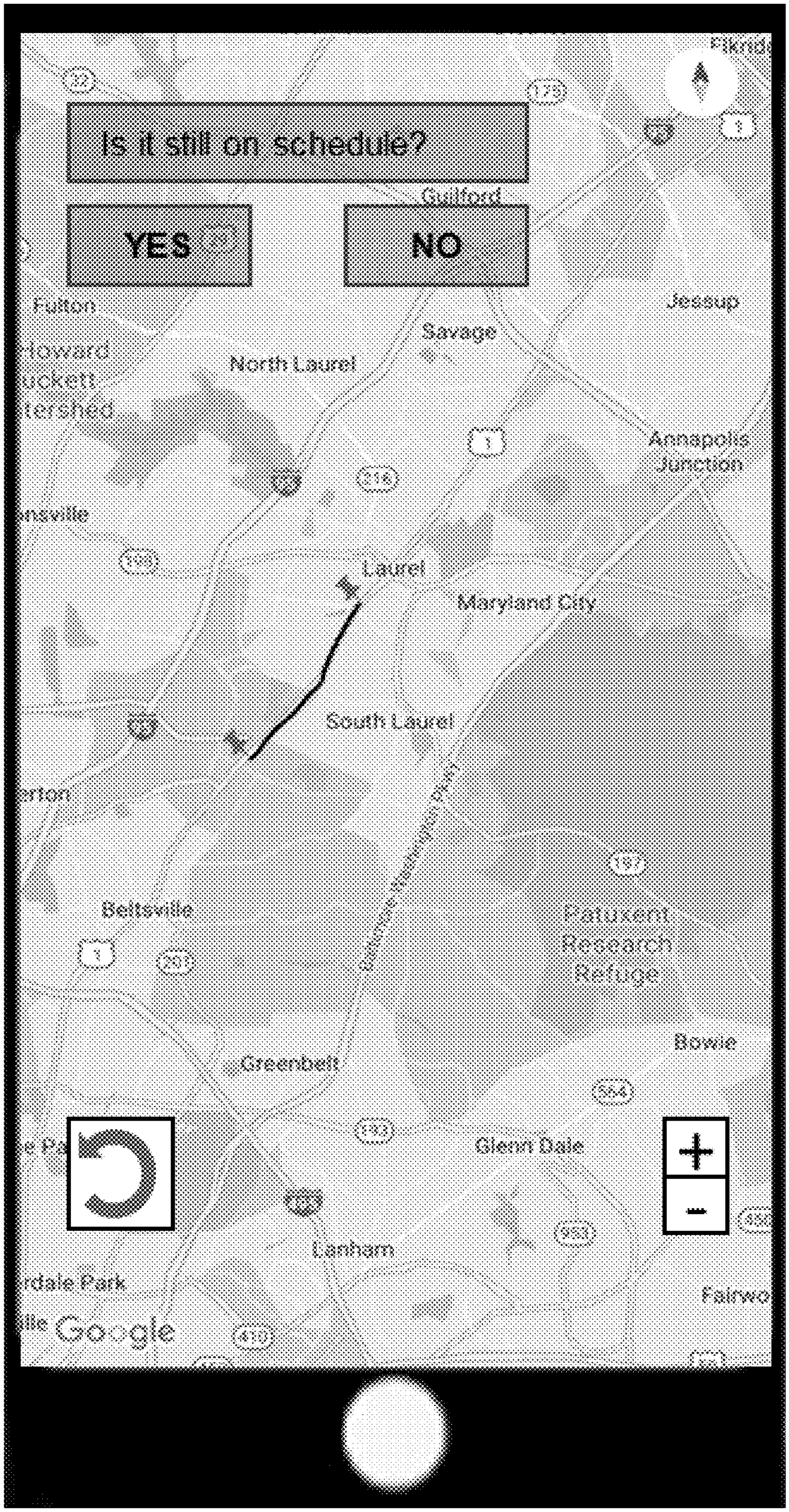
FIG. 18 is a road work status inquiry page for road work contractors according to an embodiment of the invention.

The work zone details page may include additional useful information fields, for example, status, open lanes, closed lanes, total lanes, workers present, issuing agency and shoulder closed, e.g., FIGS. 13-15. Once the contractor has completed the work zone details page, the "submit" button may be selected to present the work zone on a map page, FIG. 16. If the contractor touches the work zone location on the map, a pop-up showing the work zone details may be presented as an overlay over the map. The contractor app may optionally include a list view page of road work projects, e.g., FIG. 17. From this page, the contractor may edit or delete existing projects and add new projects. In the FIG. 1B, this process is described from step 321 to 325. Once the contractor is satisfied with the information provided in the form it can hit "submit" in step 321 via 421. From there, the contractor will be taken to the map page in 322 showing the new and existing work zone provided them (user specific, cannot see the submission of other contractors to maintain privacy and restricting data manipulation). Following steps 323 to 325 via 423 to 425, the contractor can see its submission, profile, log out and settings to make necessary required changes. Then from step 325, the contractor will be taken back to the step Map page with all the information provided (313) via 426. From there, contractor can start the process again for a new work zone or return to steps 323 to 325 for editing the existing one. In the case of future road work projects, the app can be configured to send push notifications to the contractor asking if the project is still on schedule, e.g., FIG. 18, to which the contractor may respond yes or no. In the event the contractor clicks "no," the app will return the contractor to the projects list page or to the work zone information page and prompt the contractor to provide updated road work zone information.

The description of the contractor interface having been described, the description will now turn to the driver interface.

Figure 1C:
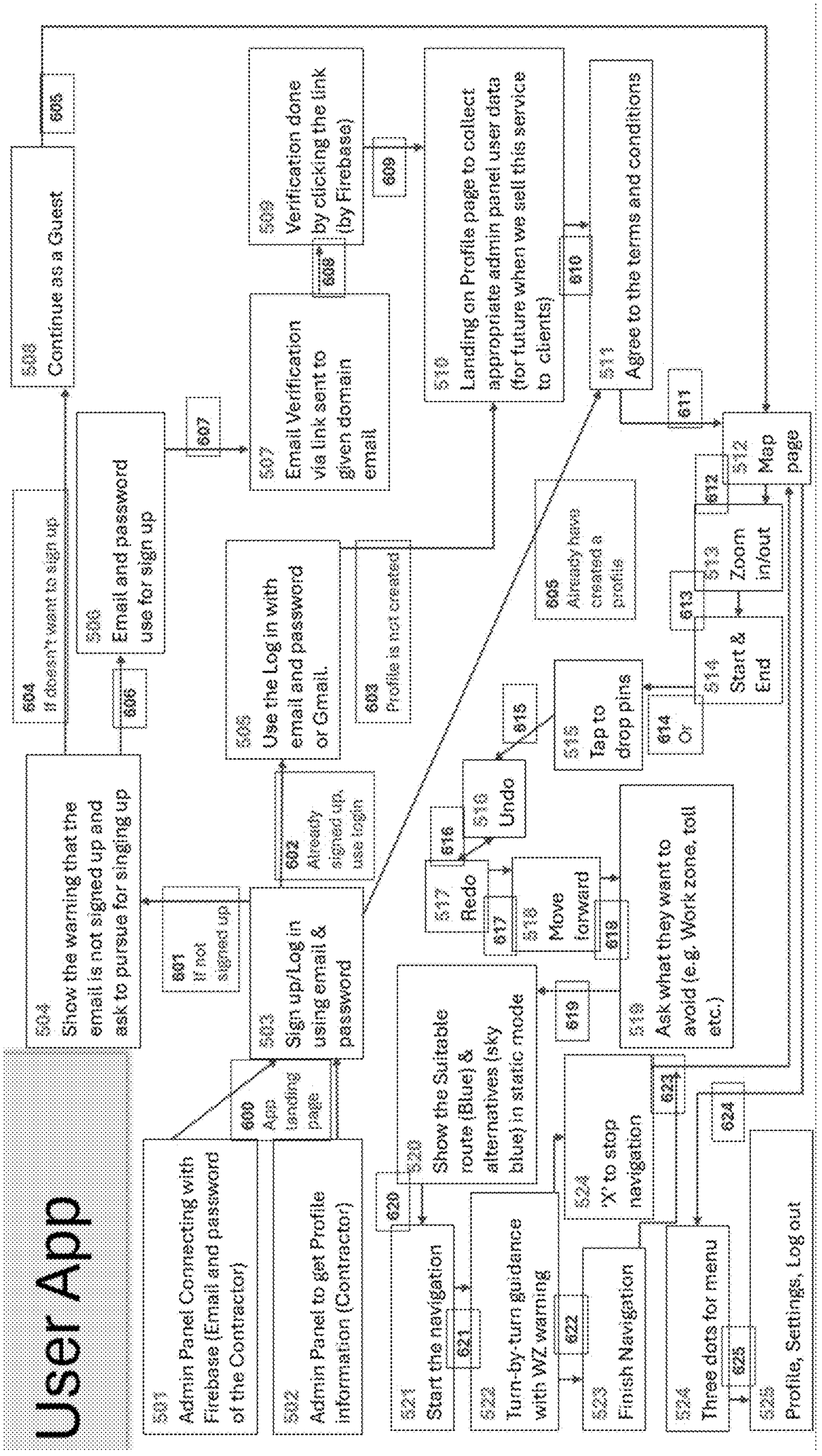
FIG. 1C is a chart showing steps involved in the driver app according to an embodiment of the invention.
Figure 19:
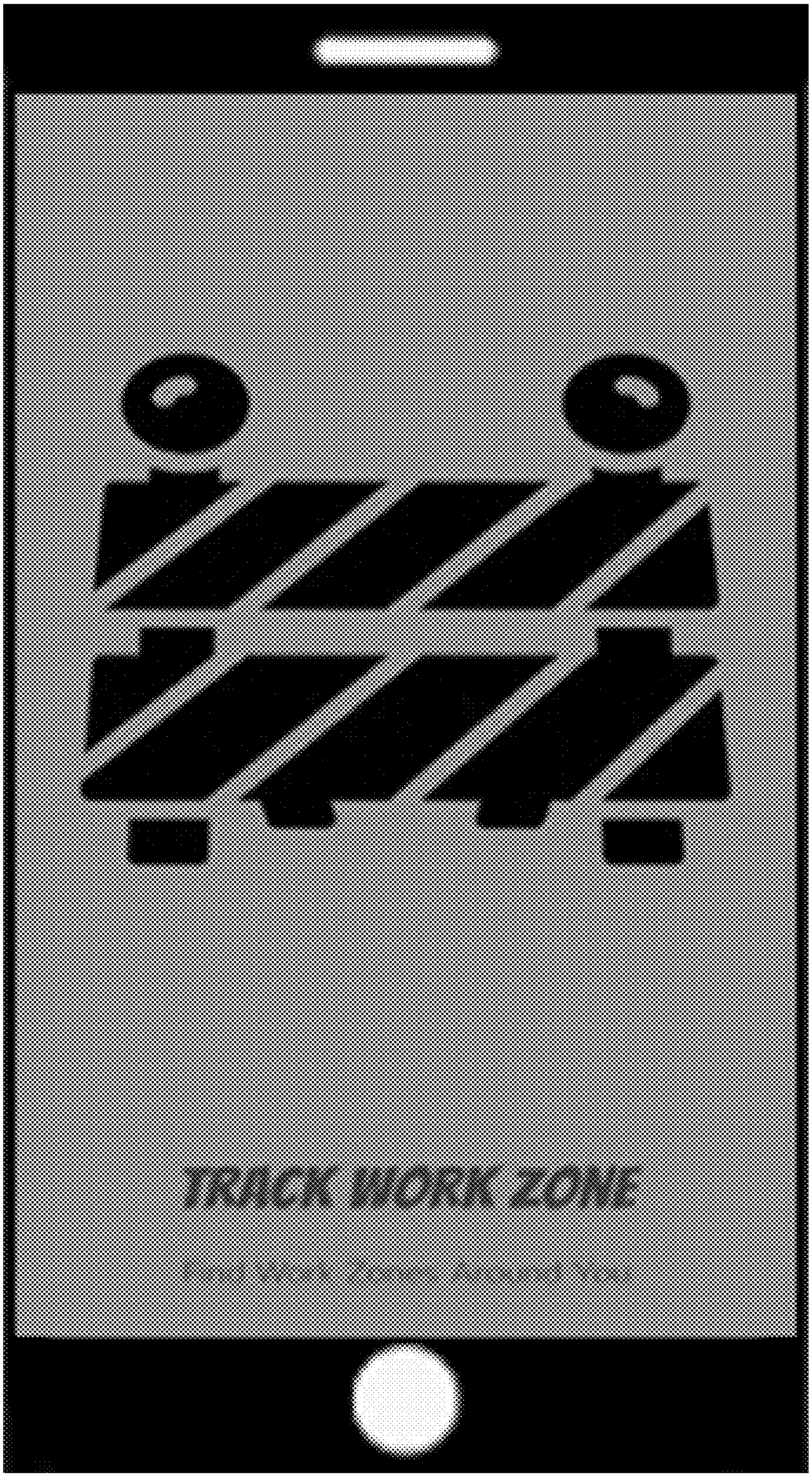
FIG. 19 is an app landing/welcome page for commercial drivers according to an embodiment of the invention.
Figure 20:
FIG. 20 is a login/registration page for commercial drivers according to an embodiment of the invention.
Figure 21:
FIG. 21 is a registration page for commercial drivers according to an embodiment of the invention.

As with the contractor app, once the driver app has been downloaded and installed on the driver's mobile device, the driver app icon (e.g., FIG. 19), which may be the same (as shown) or different from the contractor app icon, will appear on the driver's mobile device. To launch the app, the driver clicks on the app icon in the standard fashion. This action opens the login/register page, e.g., FIG. 20. If the driver has already signed up for the service, then he/she may use authorized credentials to log in. If the driver is not already an authorized user, he/she may be required to register by clicking on the sign-up button, which will take the user to the registration form, e.g., FIG. 21. Optionally, the driver app may permit the user to proceed with use of the app as a "guest" by clicking a "continue as guest" button, see, e.g., FIG. 20. The FIG. 1C illustrates the process and steps, with steps shown in 500 series blocks and conditions shown in 600 series blocks. When the driver clicks the app icon and lands on to the sign-up/log in page, there will 4 possible scenarios. Scenario 1—if the driver is already signed up and created his/her profile, then he/she will be forwarded directly to step 511 (terms and condition agreement) via 605. Upon agreeing to terms and conditions then user will be taken to Map page on step 512 via 611. In the case of scenario 2—the driver has signed up and logged in using the credentials but has not completed the profile, he/she will be taken to step 510 via 603 to complete the profile and then move to step 511 via 610 and following on. Scenario 3—if the driver is not signed up. He/she will be given warning (step 504 via 601) and asked to sign up using their email and/or social media account (step 506 via 606). There will be a verification of which signing up which will follow similar protocol by sending a verification link to the email (step 507 via 607). The verification will be done by clicking the link sent to the email (step 509 via 608). Then he/she will be taken to profile page step 510 and follow steps to reach to the Map page at step 512. The fourth scenario—user will be given a warning that he/she is not signed up in step 504 via 601. If they wish to continue as a guest, they will follow step 508 via 604 and will be taken to step 512 via 605.

Figure 22:
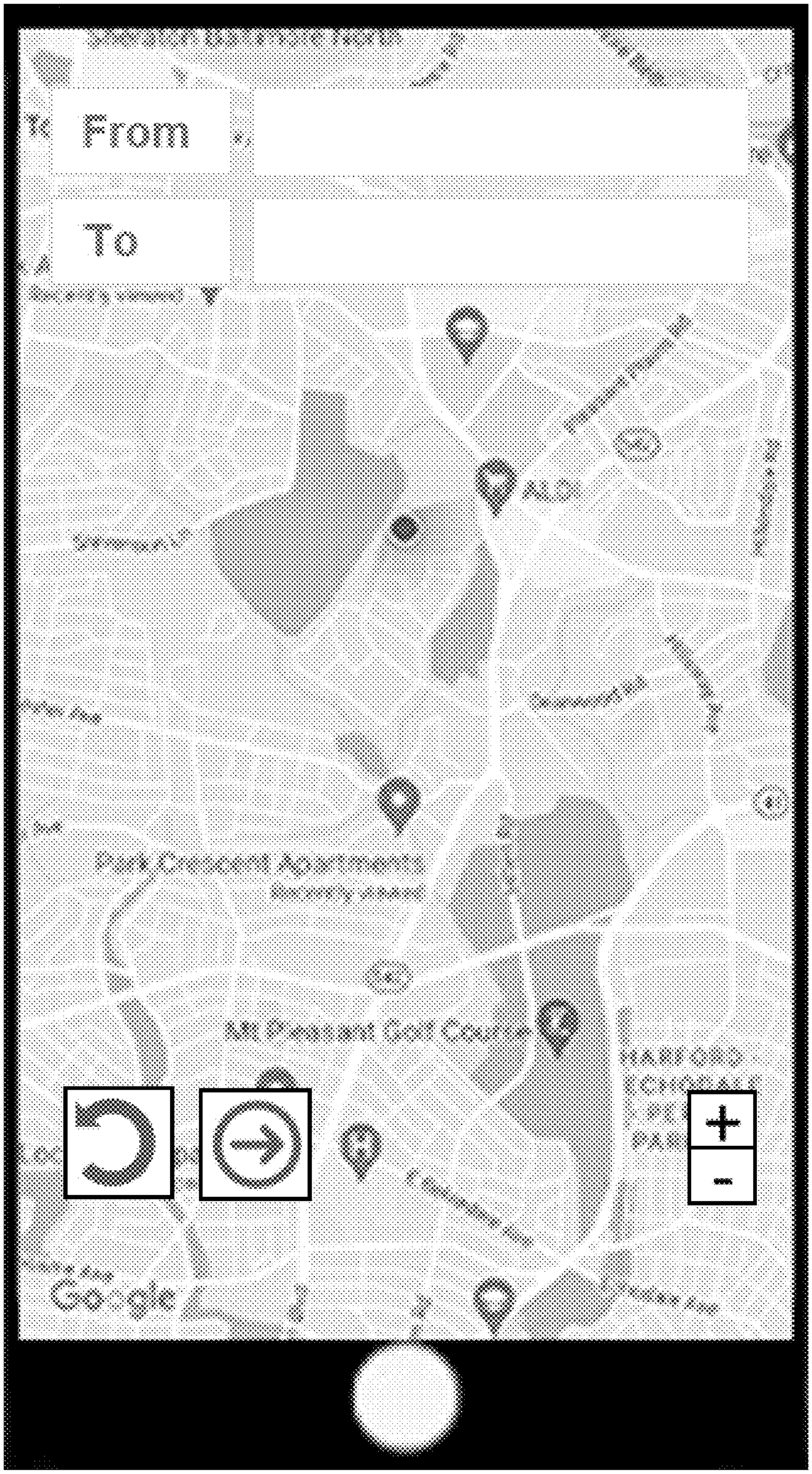
FIG. 22 is a trip start and finish entry page for commercial drivers according to an embodiment of the invention.
Figure 23:
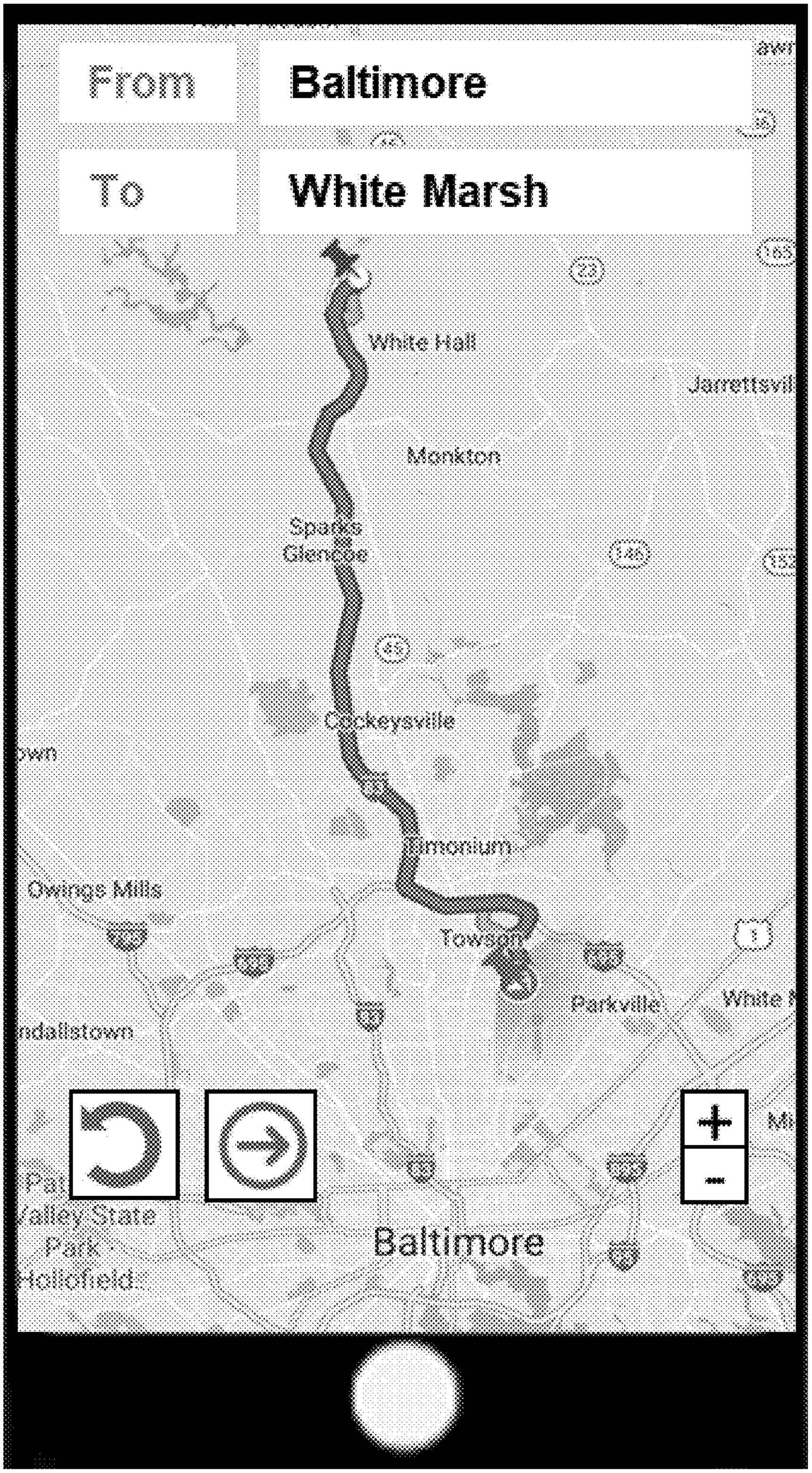
FIG. 23 is route overview page for commercial drivers according to an embodiment of the invention.
Figure 24:
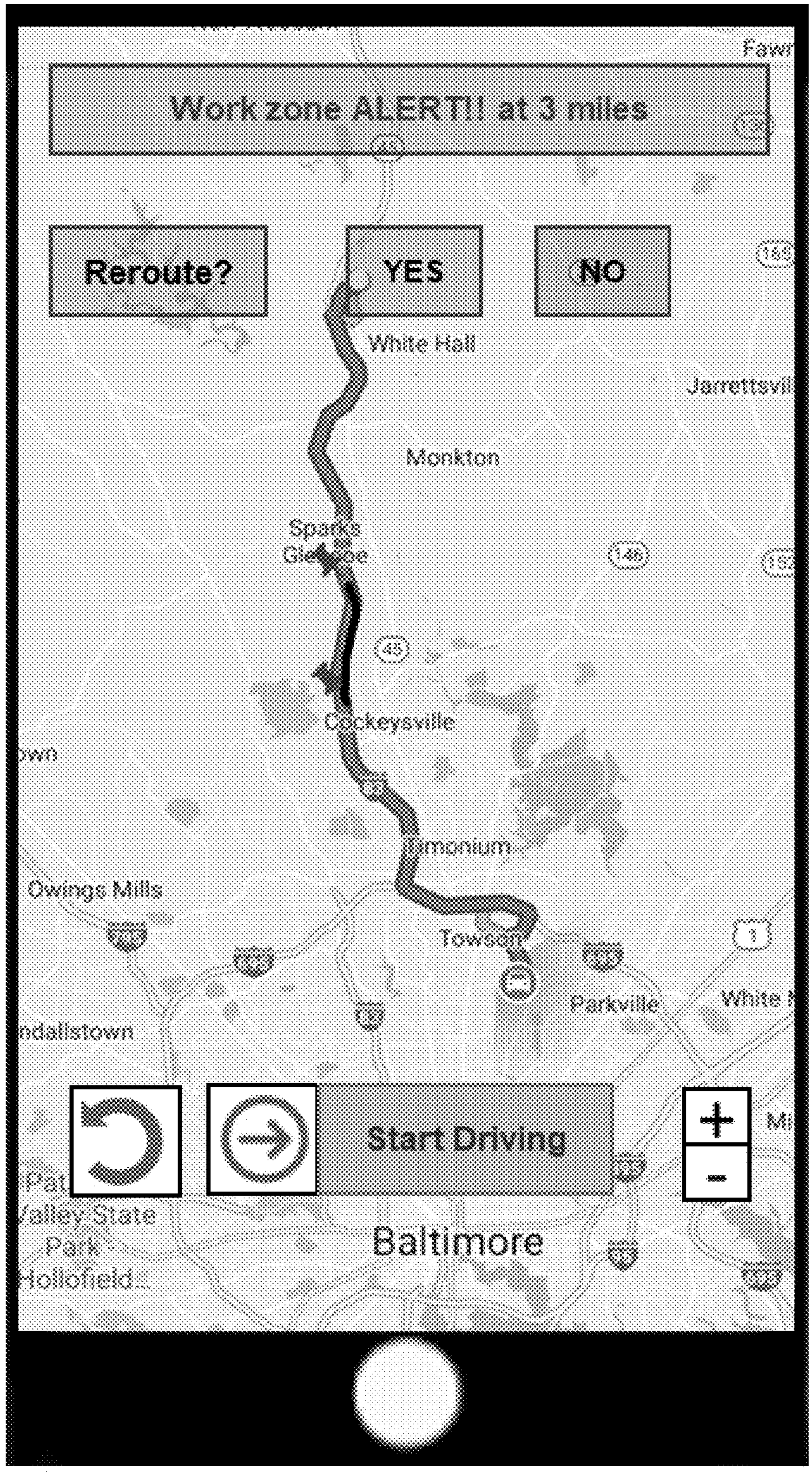
FIG. 24 is a work zone alert page for commercial drivers according to an embodiment of the invention.
Figure 25:
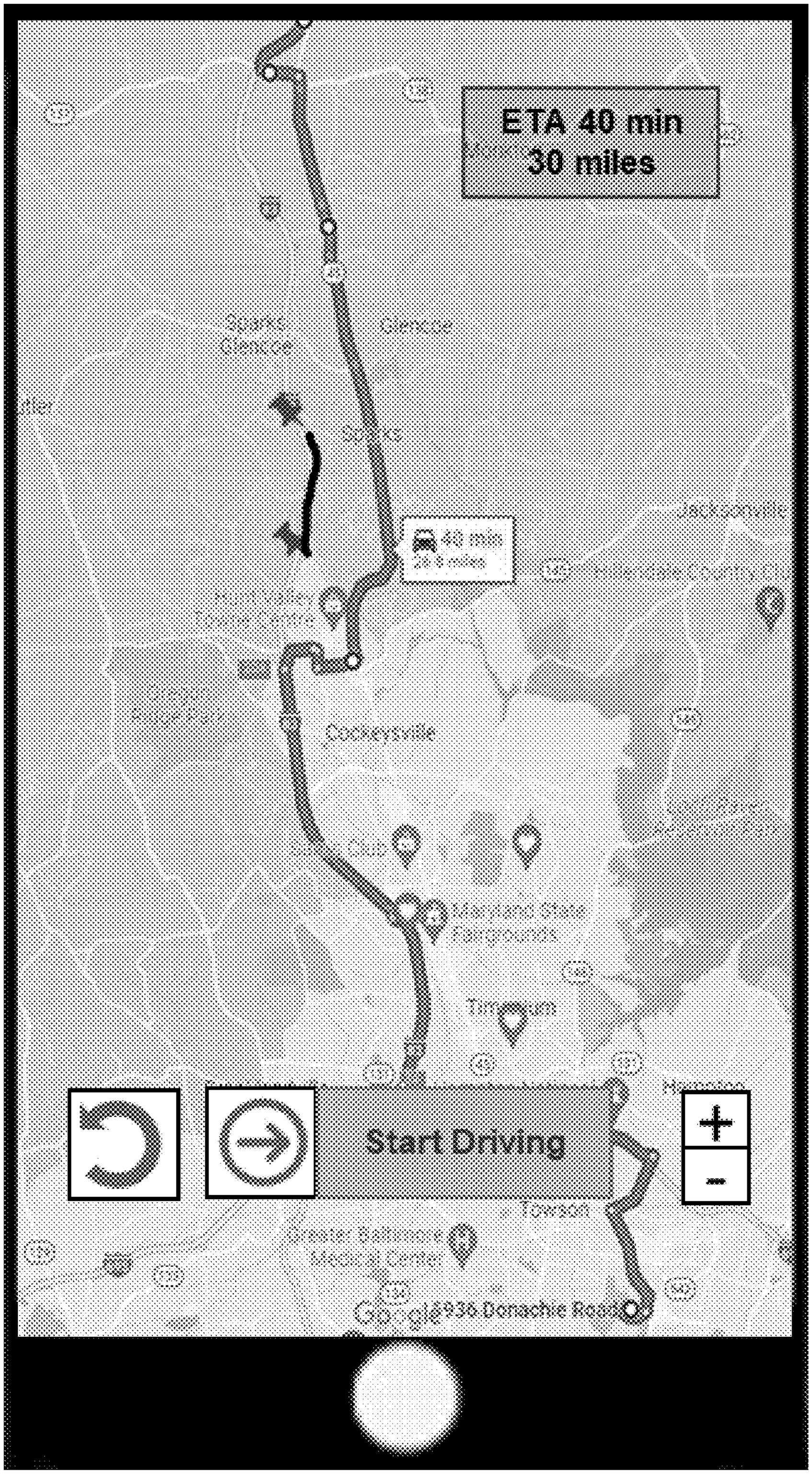
FIG. 25 is an alternate route overview page for commercial drivers according to an embodiment of the invention.
Figure 26:
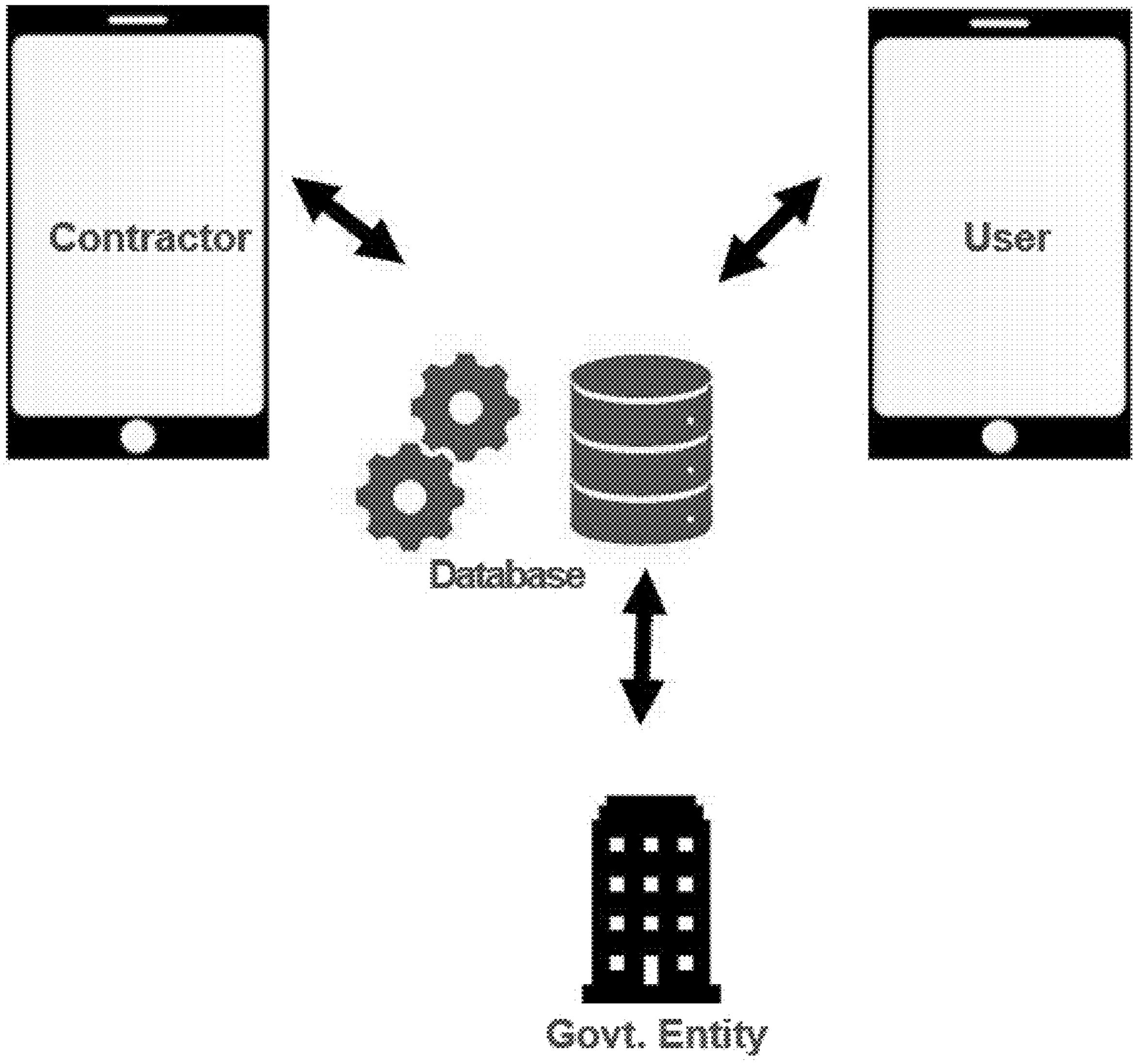
FIG. 26 is a representation of road work contractors, commercial drivers and government agencies exchanging information with a database according to an embodiment of the invention.

Following login, the driver is presented with a map page, e.g., FIG. 22, optionally tied to the driver's current location as determined by the GPS in the user's mobile device. On the map page, the driver is prompted to enter navigation start and end locations. Using standard navigation databases and protocols, the app will determine and display recommended and (optionally) alternate routes for the driver's selection, optionally including distance and travel time for each route, e.g., FIG. 23. Accessing the road work data entered by contractors into the contractor app, the system will determine whether there are any active or imminent road work zones on the driver's selected route. This determination may be made before the route(s) is/are presented to the user and any active or imminent road work zones noted on the routes as presented to the driver, or after the driver has selected a route. In any case, the location of active or imminent road work zones are presented to the driver overlaid on the selected/alternate route on a map page, and the driver is presented with a choice to select an alternate route, e.g., FIG. 24. If the user clicks "yes," the app will present to the driver with an updated route that avoids the road work zone, e.g., FIG. 25. The FIG. 1C breaks down the steps in a flow chart. Once the drivers are landed on the Map page at step 512, they will have the option to zoom in or out at step 513. They can use the address, coordinates and long tap options to determine their start and end locations in steps 514 to 515 via steps 613 and 614. They can always undo and redo their input using steps 516 and 517 via 616. Once the Origin and Destination is correctly provided, they can simply move forward in step 519 via 617 and 618 to define their specification (e.g. avoid work zone, toll, ferries etc.). Possible and optimized routes considering the criteria user selected will be shown in step 520 via 619. The driver will again have the option to choose among the alternatives if they wish to and start the navigation in step 521 via 620. In step 522, they will receive turn by turn voice navigation commands with appropriate warnings at the given conditional distance. Once they reach their destination, the navigation will be finished (step 523) and the app will return back to the Map page at step 512. The drivers will also have the freedom to cancel the navigation anytime using the step 524 and returned back to

512. Lastly, user can check and update profile, settings etc. following the steps 524 and 525 from 512 via 624 and 625.

According to further embodiments which include a government agency interface, the government interface may be a third app; the government interface may be integrated with the contractor app, or the government interface may be part of a fully integrated app with three separate workflows, one each for the contractor, the driver, and the government agency.

Figure 1D:
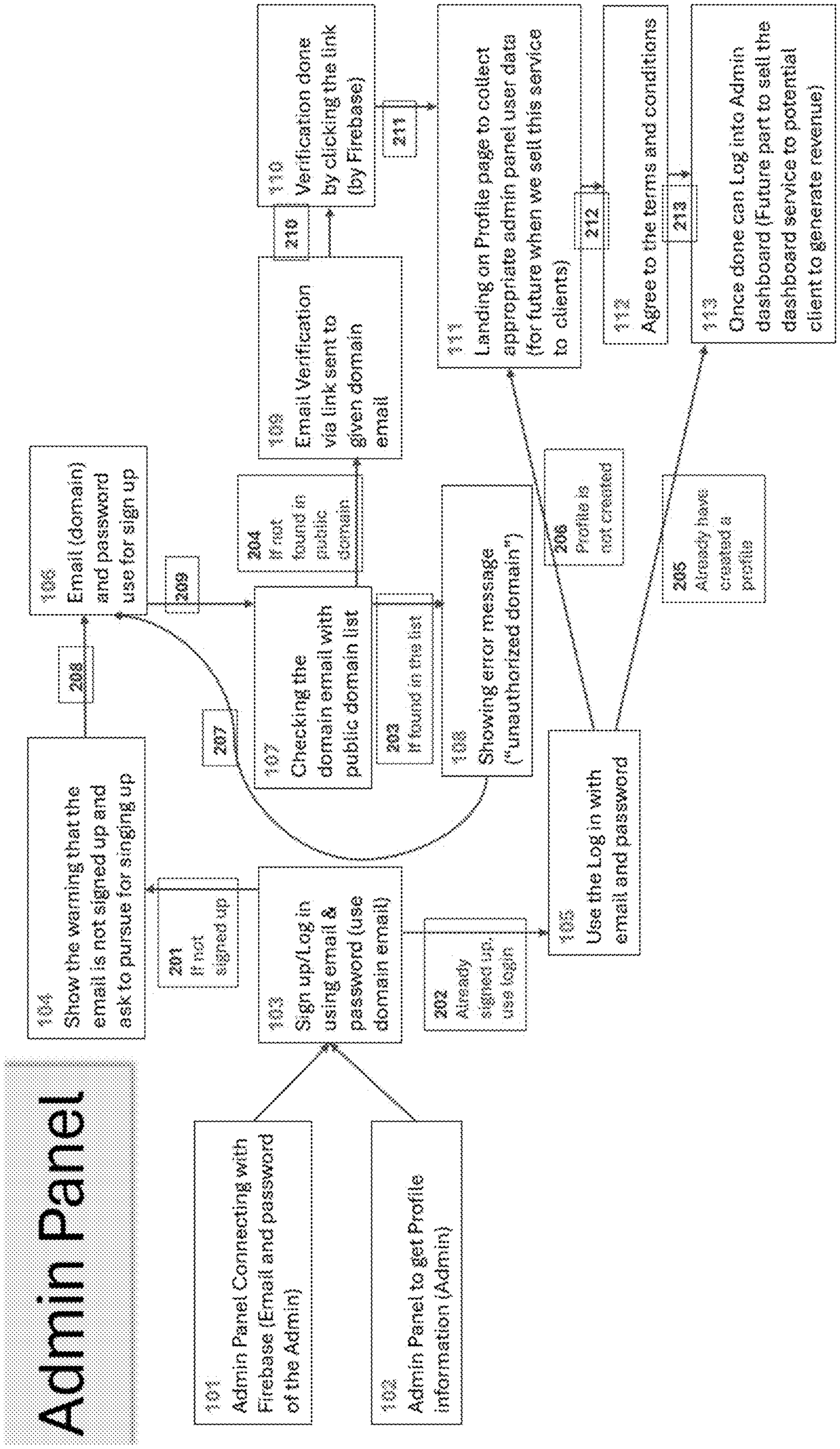
FIG. 1D is a chart of the administrative steps according to an embodiment of the invention.

The interface between the contractor app and the driver app (and an optional government app) is managed by a cloud-based management server and database that retrieves/receives from the contractor app data relating to road work projects entered by contactors on their respective contractor apps, optionally validated via interactions with a government app. The optionally validated road work information is then transmitted to driver apps for use in driver navigation/route planning as described above. The Admin panel dashboard as described in the FIG. 1D (steps shown in 100 series blocks and conditions shown in 200 series blocks) can work as a common platform for the government entities, transportation management centers to sign up and use the data that this application will collect for better implementing their safety and improvement plans.

It will be appreciated by those skilled in the art that changes could be made to the preferred embodiments described above without departing from the inventive concept thereof. It is understood, therefore, that this invention is not limited to the particular embodiments disclosed, but it is intended to cover modifications within the spirit and scope of the present invention as outlined in the present disclosure. It is specifically noted that each and every combination and sub-combination of the above-listed and below-described features and embodiments is considered to be part of the invention.

The invention claimed is:

1. A computer-implemented navigation system for providing drivers with accurate and real-time road work information comprising:

a. a management server comprising a processor and non-transient memory comprising computer-readable instructions, said computer-readable instructions comprising a management module, a road work contractor module and a driver module, b. said road work contractor module comprising contractor module computer readable instructions which when executed by a contractor device processor cause a contractor device to present a login screen to a contractor user, verify that the contractor user has an authorized user credential associated with a government-authorized domain list to ensure the authenticity of road work data, receive contractor input from the contractor user concerning location, date, and time of road work, and structured work zone attributes comprising at least number of lane closures, length of the work zone, average speed in the work zone, type of road, workers present, and shoulder closed status, and transmit said contractor input including said structured work zone attributes to said management server, c. said driver module comprising driver module computer-readable instructions which when executed by a driver device processor cause a driver device to prompt a driver for a driving destination, compute at least one navigation route to the driver input driving destination, receive road work data including said structured work zone attributes from said management server, determine whether said road work data intersects with said at least one navigation route, present a work zone alert to said driver at a predetermined distance before the work zone, calculate at least one alternative road work avoiding navigation route and present said at least one alternative road work avoiding navigation route to said driver on said driver device, d. said management module comprising management module computer-readable instructions which when executed by a management server processor cause said management module to receive and store road work data including said structured work zone attributes from said road work contractor module, and selectively transmit at least selected road work data to said driver module based on relevance to a driver's navigation route.

2. The computer-implemented navigation system according to claim 1, wherein the management module is cloud-based.

3. The computer implemented navigation system according to claim 1, said management servicer further comprising a government agency module, said government agency module comprising government agency module computer readable instructions which when executed by a government agency device processor cause a government agency device to present a login screen to a government user, receive road work data from said management server, receive verification input from said government user, and transmit said verification input to said management server.

4. The computer-implemented navigation system according to claim 3, wherein said driver module, said contractor module, and said government agency module are downloadable from said management server to a driver device, a contractor device, and a government device, respectively.

5. The computer-implemented navigation system according to claim 3, wherein communication between said management module, said driver module, said contractor module and said government module takes place over a wide-area distributed wireless network.

6. The computer-implemented navigation system according to claim 3, wherein said driver device is a mobile device, wherein said contractor device is a mobile device, a desktop computer, a laptop computer or a kiosk, and wherein said government agency device is a mobile device, a desktop computer, a laptop computer or a kiosk.

7. The computer-implemented navigation system according to claim 1, wherein said driver module and said contractor module are downloadable from said management server to a driver device and a contractor device, respectively.

8. The computer-implemented navigation system according to claim 1, wherein communication between said management module, said driver module, and said contractor module takes place over a wide-area distributed wireless network.

9. The computer-implemented navigation system according to claim 1, wherein said driver device is a mobile device and wherein said contractor device is a mobile device, a desktop computer, a laptop computer or a kiosk.

10. The computer-implemented navigation system according to claim 1, wherein said driver module further comprises computer-readable instructions which when executed cause a driver device to provide audio-based road and road work information to the driver, and after the driver passes a work zone, present a voice prompt asking the driver whether the road work zone information provided was correct and receive driver feedback in response thereto.

11. The computer-implemented navigation system according to claim 1, wherein said management server is further configured to communicate road work data to connected vehicles through Vehicle to Infrastructure (V2I) and Vehicle to Vehicle (V2V) communication protocols using Dedicated Short-Range Communications (DSRC) via at least one Roadside Unit (RSU), wherein received road work information is stored on a connected vehicle only if the road work information falls within a chosen route of the connected vehicle, and wherein stored road work information is validated with other connected vehicles and Roadside Units during a trip.

* * * * *